No. 628,757. Patented July 11, 1899.
G. A. CHADDOCK.
SHIP.
(Application filed Dec. 28, 1896.)
(No Model.) 5 Sheets—Sheet 2.
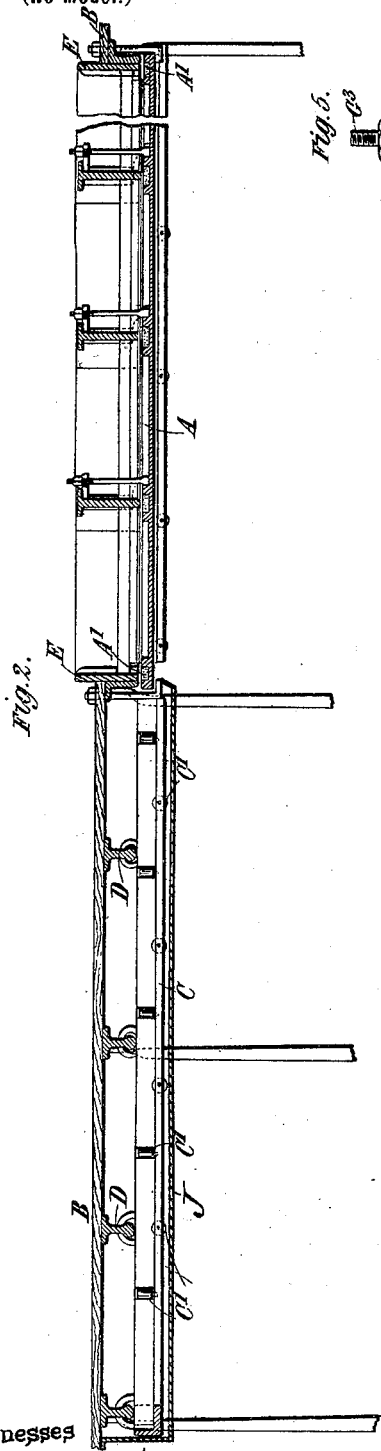
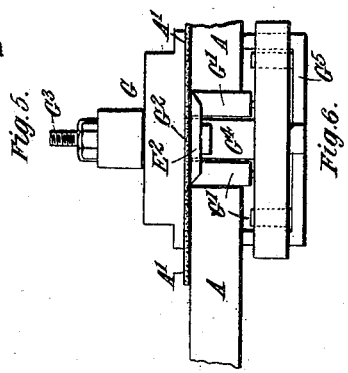
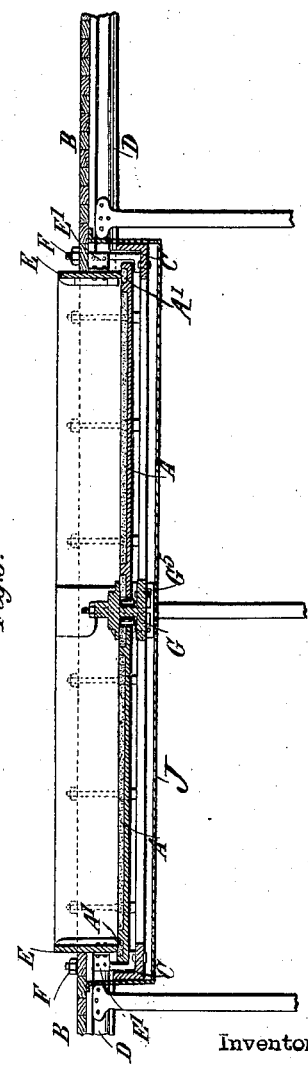
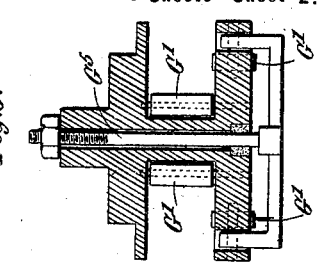
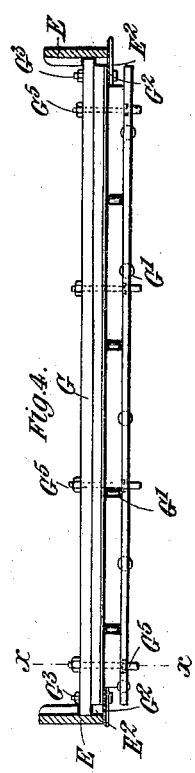
Witnesses
Inventor George A. Chaddock
by James L. Norris
Attorney No. 628,757. Patented July 11, 1899.
G. A. CHADDOCK.
SHIP.
(Application filed Dec. 28, 1896.)
(No Model.) 5 Sheets—Sheet 3.

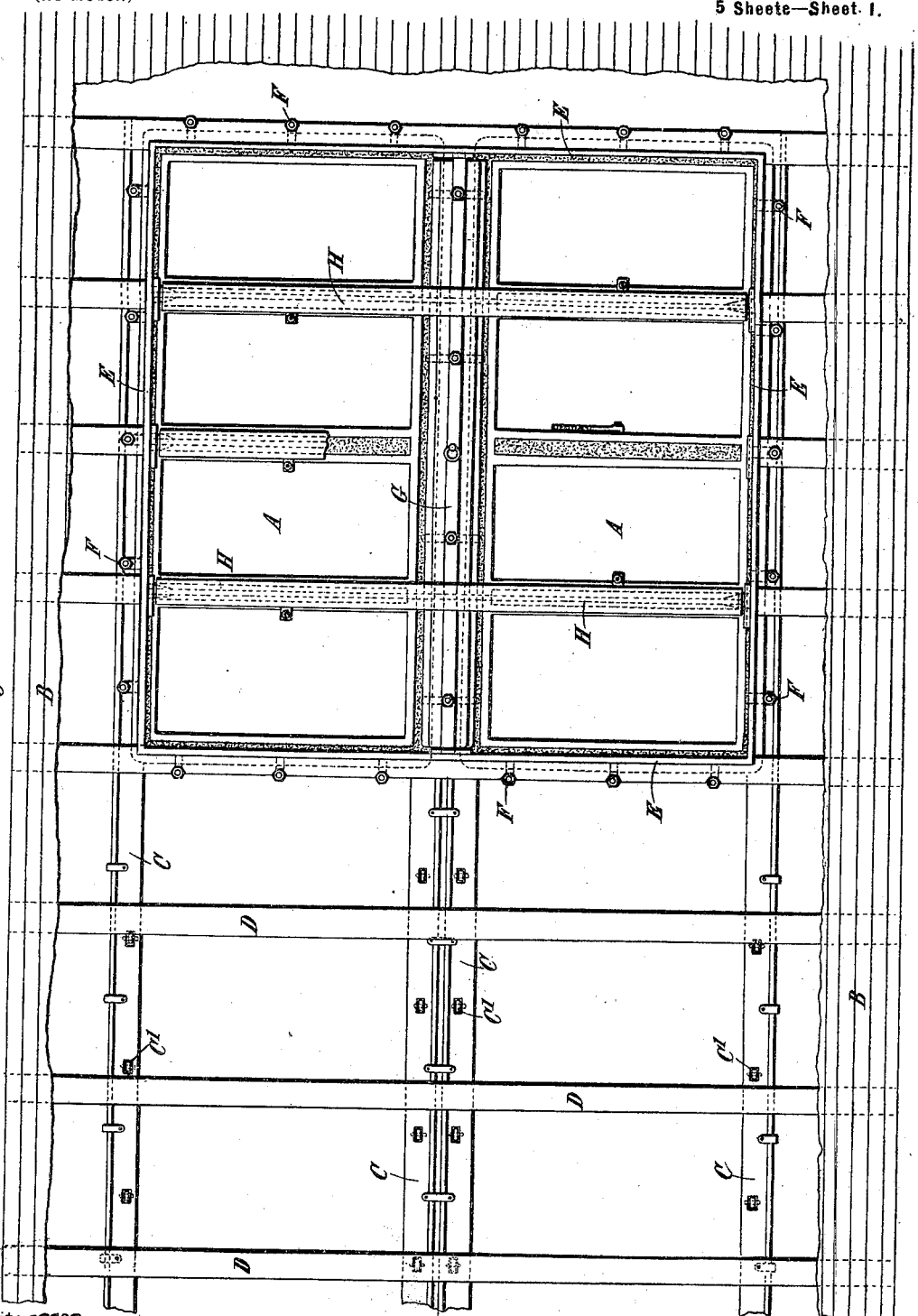

No. 628,757. Patented July 11, 1899.
G. A. CHADDOCK.
SHIP.
(Application filed Dec. 28, 1896.)
(No Model.) 5 Sheets—Sheet 4.
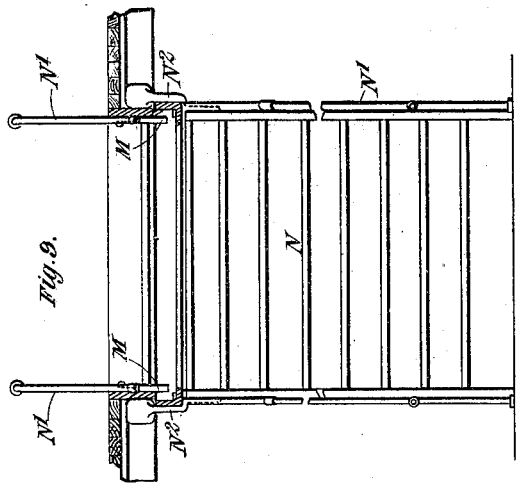
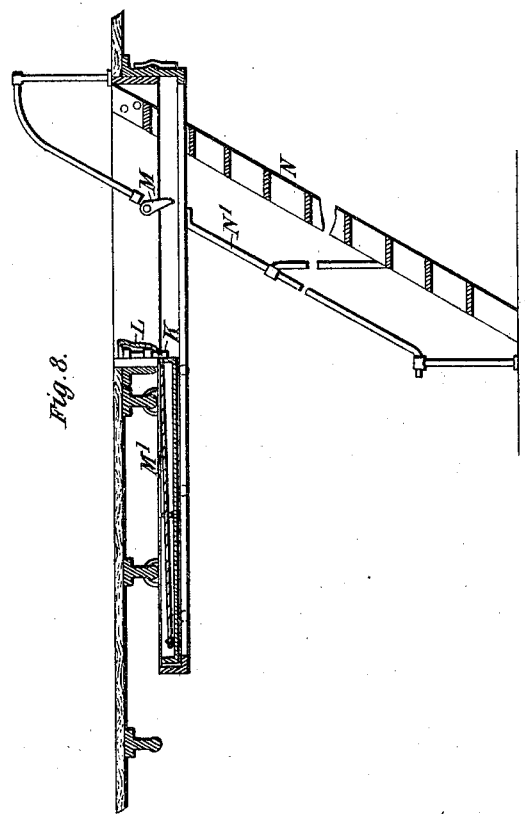
Witnesses.
Dennis Dumby
Robt Everett
Inventor.
George A. Chaddock.
By James L. Norris
Atty.
THE NORRIS PETERS CO., PHOTO-LITHO., WASHINGTON, D. C.

No. 628,757. Patented July 11, 1899.
G. A. CHADDOCK.
SHIP.
(Application filed Dec. 28, 1896.)
(No Model.) 5 Sheets—Sheet 5.

Witnesses.
Dennis Sumby.
Robert Everett.

Inventor.
George A. Chaddock,
By
James L. Norris.
Atty.

UNITED STATES PATENT OFFICE.

GEORGE ALBERT CHADDOCK, OF LONDON, ENGLAND.

SHIP.

SPECIFICATION forming part of Letters Patent No. 628,757, dated July 11, 1899.

Application filed December 28, 1896. Serial No. 617,219. (No model.)

*To all whom it may concern:*

Be it known that I, GEORGE ALBERT CHADDOCK, master mariner, of 6 Crosby Square, London, England, have invented certain new and useful Improvements in Ships, (for which I have obtained Letters Patent in Great Britain, No. 13,914, dated June 23, 1896, and in France, No. 269,567, dated August 12, 1897,) of which the following is a specification, reference being had to the accompanying drawings.

This invention relates to improvements in merchant and other ships, and has for its objects the greater security of the ship and of life and property therein when at sea.

By my invention I make the decks capable of resisting the upward pressure of water from below, as well as the weight of cargo on top, and I provide for closing the hatchways or other openings by hatches battened up or secured by being drawn upward against the hatch coamings or carlines instead of being secured by battening down as heretofore or by simply laying on from the top. By these means the hatch is made capable of resisting the upward pressure of water from below without bringing the stress of such pressure on the bolts or other fastenings, and so greater security is obtained than is possible with hatches constructed and secured as heretofore.

My improved hatches are preferably constructed to slide in guideways or on rollers underneath the deck as close as possible or convenient to the deck-beams, and the said hatches are secured when closed by devices that press them tightly against the coamings or carlines of the hatch and against the strengthening fore-and-afters and crossbeams in the hatchway where such are used, any suitable water-tight medium being employed to insure a water-tight joint.

My invention also includes other improvements hereinafter described.

Figure 10:
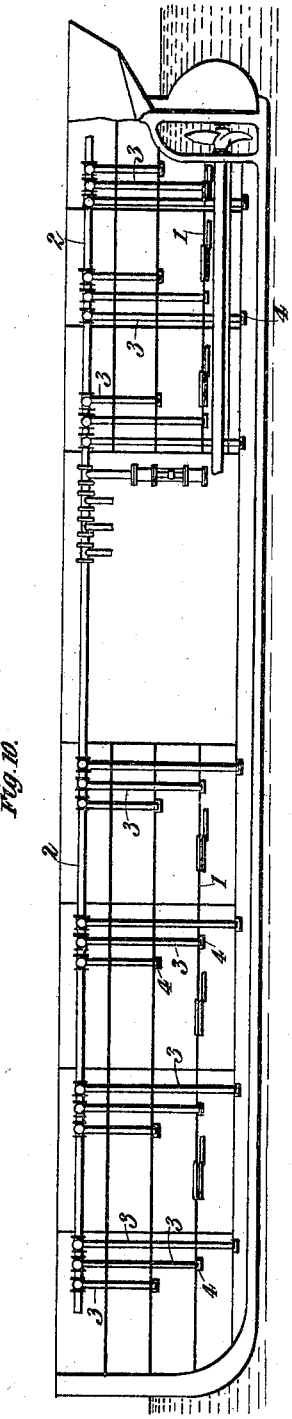

In constructing a ship according to my invention I prefer to provide a lower security-deck I, Figure 10, adapted to resist the upward pressure of water in the event of the bottom of the ship being rent by striking against a rock or otherwise, the said deck I being, as already stated, also capable of resisting the weight of cargo on top thereof.

The spacing of such security-deck I should be regulated by the build of the ship, the number of decks thereon, and the height of freeboard when loaded. The stanchions that I use for securing the deck act not merely as pillars to support the weight of the decks, but they act to resist the upward pressure of water or air against the deck when water enters the hold from below. For this purpose I considerably extend or enlarge the base and head of the stanchion for the reception of a sufficient number of bolts to insure the requisite holding power equivalent in strength to that of the stanchion. The base and head of the stanchions are suitably shaped in all cases to properly fit the parts to which they are attached—that is to say, whether the keelson or sister keelsons and deck-beams—and the said parts are where necessary suitably strengthened to bear the strain that may come upon them. The enlargement of the heads of the stanchions is shown in Fig. 3. This same system of staying the deck may be applied to the upper decks, as well as to the lower security-deck, and, in combination with the hatches now to be described, insures a very strong and safe ship.

Figure 7:
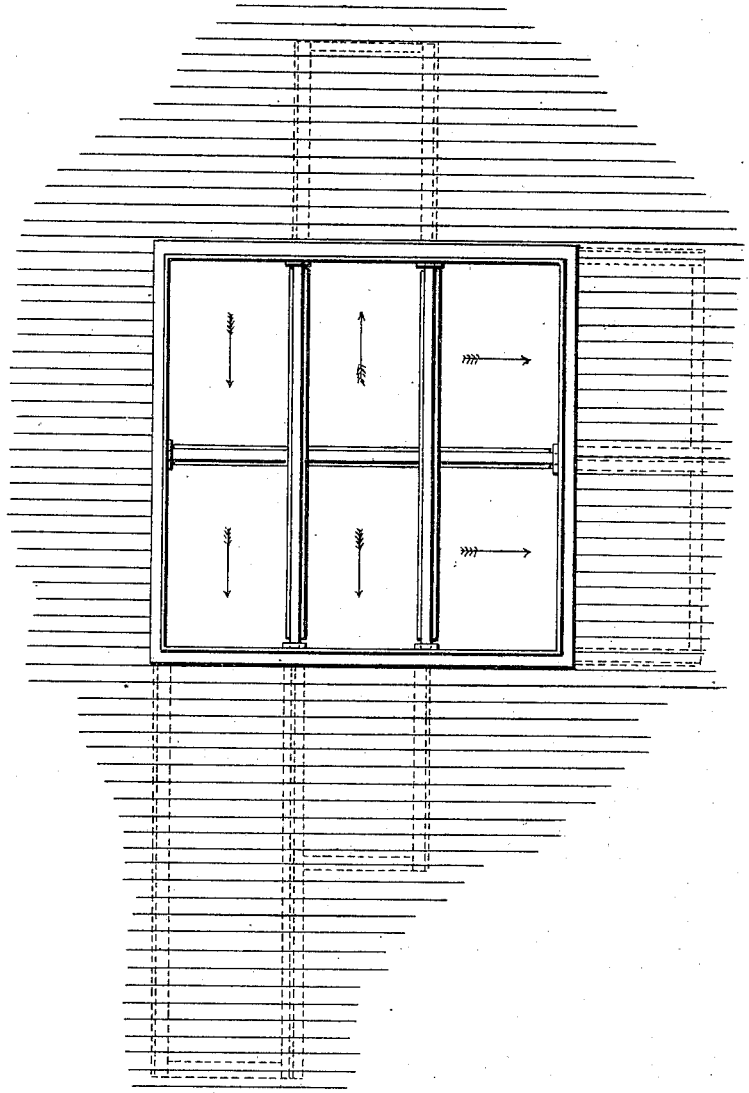

Referring to the accompanying drawings, Fig. 1 is a plan of a hatchway adapted to be closed by two hatches, a portion of the deck-flooring being removed to show the guides for the hatches. Fig. 2 is a longitudinal section, and Fig. 3 is a transverse section, of the hatch. Fig. 4 is a side elevation of a removable beam forming a guide and support for the inner sides of the hatches and showing the manner of supporting the said beam by the coamings. Fig. 5 is an end view of the said beam on a larger scale, and Fig. 6 is a transverse section on the line $xx$ of Fig. 4, also on a larger scale. Fig. 7 is a plan showing diagrammatically one arrangement where several hatches are employed to close the hatchway. Fig. 8 is a fore-and-aft section, and Fig. 9 is a transverse section, of a companion-way and hatch constructed according to my invention; and Fig. 10 is a diagrammatic longitudinal section of a ship, showing the security-deck and an arrangement of pipes for draining the decks, as hereinafter described.

Like letters and numerals of reference denote corresponding parts in the several figures.

A is the hatch, which can slide underneath the deck B in guides C, secured to the deck-beams D.

C' C' are rollers provided in the guides to facilitate the sliding movements of the hatch.

E E are the coamings or carlines of the hatchway, firmly secured by angle-brackets E' or otherwise to the deck-beams. To close the hatchway, the hatch is moved from under the deck into position under the hatchway and is then drawn upward by bolts F F and pressed tightly against the edge of the coamings or carlines. The securing-bolts are placed at suitable intervals all around the hatchway and are provided with heads adapted to engage with the edge of the hatch, as shown, or in some instances with lugs or arms projecting from the hatch. The bolts on one side of the hatchway can when slackened be turned and raised out of the way of the hatch, so as to allow the hatch to move in and out as desired.

To insure a good water-tight joint between the hatch and the coamings, I furnish the former with india-rubber or other suitable packing material A', placed in a groove or otherwise secured in position. A single moving hatch would of course be suitable only for small hatchways or openings. For closing large hatchways it is necessary to provide two or more hatches. Figs. 1, 2, and 3, for example, show a preferred construction suitable for new ships with spacing specially arranged therefor, two long hatches being arranged side by side and working fore and aft or across. The joint between the hatches is made by a central removable beam G, constructed with guide grooves or channels at the sides and furnished with rollers G' to act as guides for the inner adjacent edges of the hatches. The ends of the said beam are suitably supported by the coamings, preferably by lugs $E^2$, provided on the face of the coamings, as shown in Fig. 4, and locked by bolts $G^3$, which serve to tighten the packing material $G^2$ against the coamings and make a water-tight joint therewith. The beam can be speedily removed after the hatches are slid back by removing the locking-bolts and then moving or turning the beam laterally. The enlarged end view and section of this beam shown in Figs. 5 and 6 illustrate its construction. The bolts $G^3$ act through plates $G^4$ to compress the packing against the beam and coamings to insure a water-tight joint.

$G^5$ $G^5$ are bolts for securing the hatches to the beam. The said bolts are preferably T-shaped, and the arms may be bent or straight and may be pivoted at the center. When the said bolts are tightened up, the ends of the arms bear against the lower faces of the two hatches and press the hatches against the upper face of the grooves in the beam. The hatches are fitted with packing material and a water-tight joint is insured. The packing material A' at the ends of the hatches is made with a beveled edge, as shown in Fig. 5, to fit closely against the correspondingly-beveled edge of the packing $G^2$, so that the two packings can overlap and make a secure joint without necessitating more than one thickness of packing.

After the hatches are secured in place I prefer to further support them and the hatchway by cross-beams H, inserted between the sides of the hatchway in line with the deck-beams. The hatch may, if desired, be secured to these beams, and compressible bearing or packing pieces may be inserted between the hatches and the said cross-beams, so that the latter may assist in supporting the hatch against upward pressure.

The center guides C for the hatches may be arranged on each side of the midship stanchions without interfering therewith. The hatches may be strengthened by the central bulkhead or by "shifting boards," where such are used; but if the ship is not constructed with a central bulkhead and is not furnished with shifting boards the hatches may be strengthened to resist upward pressure by stanchions above same in lieu of or in addition to the cross-beams above referred to.

It is obvious that the number and arrangement of the hatches for each hatchway may be varied without departing from the spirit of my invention. For example, in Fig. 7 I have shown a large hatchway closed by five hatches, two of which open forward, two laterally on opposite sides, and the fifth, which is a long one, also opens laterally. I can provide any other arrangement of hatches, according to the available room as controlled by the ship's sides and bulkheads and position of the hatchway.

If in any case the coamings are not continuous by reason of the interposition of a bulkhead—for example, at the fore-and-after end of the hatchway—the completion of the coamings may be effected by a suitable attachment on the bulkhead, which would be furnished with the necessary fixtures for securing the hatches.

In all cases a protective sheathing is provided to prevent the cargo shifting to such a position where it would interfere with the opening of the hatches.

In applying my invention to small hatches for companion-ways I provide a bolt K, Fig. 8, which can be dropped in front of the hatch to prevent the accidental closing of the hatch by the motion of the vessel. Such a hatch can be unfailingly and instantly closed in cases of emergency by raising the retaining-bolt and simultaneously grasping and pulling the wire rope or other connection L, by which the hatch is drawn across the opening. I also prefer to provide a catch M, which when the hatch is closed will engage with one of a series of notches M' and lock the hatch in the closed position, thus preventing the rebound of the hatch when it is closed very rapidly.

The ladder or companion-steps N and handrail N' have a gap in them to admit of closing the companion-way without interfering with the steps and rail. The upper end of the lower part of the ladder is supported by brackets N², attached to the deck-beams clear of the hatch, and the upper part of the ladder is fixed to the coamings of the hatchway. The hatch may be constructed to move athwartships or fore and aft.

The lower security-deck hereinbefore referred to is shown in Fig. 10 and marked 1.

I make the decks air and water tight, and I provide suitable packing wherever required to prevent air, water, or fire from passing from deck to deck. It is obvious, therefore, that with the security-deck and improved hatches above described and with decks made air and water tight the hold will when the hatches are closed be hermetically sealed, and it will therefore be possible to pump air into the hold to sustain the ship in certain cases and prevent material loss of freeboard should the ship's bottom be broken. It will also be possible to withdraw air from the hold in case of fire. For these purposes I provide a permanent system of piping 2, Fig. 10, preferably passing fore and aft on or under one of the upper decks well above the water-line, with branch services 3 leading from the main service 2 to each hold in the several compartments. The said branches and the main service-pipe are furnished with suitable valves or cocks for closing and opening the passages as may be required. The piping 2 is connected to one or to all of the available pumps. The said piping is further utilized for drawing off leakage or drainage from cargo in lieu of the present form of scuppers and sluice-valves. For this purpose each deck if or when constructed with waterways or channels for water-drainage is fitted with a small well 4 and rose-box, to which the branches 3 are led, as indicated. The various connections are preferably under control and are regulated by suitable valves and cocks. By these means the decks can be effectively drained, while insuring the complete isolation of the several compartments, so that in case of accident to one compartment the drainage-pipes do not form channels by which water would pass to the other compartment, as do the scuppers and drainage-pipes in the arrangements hitherto in use. By the same system of pipes air can be pumped into any hold or compartment or can be exhausted therefrom, as may be required, and steam or gas that will not support combustion may be introduced into a compartment to extinguish a fire therein.

Indicators may be provided for indicating the pressure of air or water in any compartment liable to fill with water in case of accident, and other indicators may be provided for denoting the temperature in case of fire.

The ventilators communicating with the holds are placed sufficiently high to prevent overflow of water at the top and all accessories—such as sounding-wells, ventilators, pump connections, scuppers, and apertures—must be made sufficiently strong to withstand the pressure that may come upon them in the event of accident to the ship and to provide against the leakage of air.

What I claim is—

1. A ship's lower deck constructed and stayed so as to form a horizontal bulkhead and capable of resisting the upward pressure of water that may come upon it in case the ship's bottom is broken, in combination with a system of sectional sliding hatches introduced between the stanchions immediately beneath the deck-beams, means for securing the hatches when closed by pressing them upward against their seats, and means for supporting the weight of cargo above the hatch, substantially as described.

2. The combination with a ship's lower deck, of a system of hatches placed immediately beneath the deck-beams, guides in which the system of hatches can slide, means for securing the hatches when closed by pressing them upward against their seats, and removable beams across the hatchway for supporting the weight of the cargo above the hatches without taking up space to displace the cargo and for strengthening the hatches, substantially as described.

3. The combination with a ship's deck of a hatch which slides in guides beneath the deck-beams and is secured by pressing the same upward against its seat, removable beams placed across the hatchway to support the weight of cargo above the hatch and to strengthen the hatch, and a shield or sheath for the hatch and guides to prevent the cargo below the deck from interfering with the opening and closing of the hatch, substantially as described.

4. The combination with a ship's deck of a hatch that slides in roller-guides beneath the deck-beams, a seating formed by the coamings of the hatchway, india-rubber seating-rings in the hatch, bolts for securing the hatch when closed by pressing it upward against its seating, and removable beams between the coamings of the hatchway to strengthen the hatch and to support the cargo above the hatch, substantially as described.

5. The combination with a ship's deck of a plurality of hatches that slide in roller-guides underneath the deck-beams, a seating formed by the coamings of the hatchway, india-rubber seating-rings in the hatches, bolts for securing the hatches when closed by pressing them against their seats, and removable beams for strengthening the hatch and for supporting the cargo on top of the hatch, some of said beams being constructed to form guides for the hatches, substantially as described.

6. The combination with a ship's deck, of a companion-hatch that slides in roller-guides beneath the deck-beams, means for securing the hatch when closed by pressing it upward against its seating, and companion-steps and rail formed with a gap to allow the hatch to move to and fro, substantially as described.

7. The combination with a ship's deck, of a companion-hatch that slides in roller-guides beneath the deck-beams, a seating formed by the coamings of the hatchway, a seating-ring in the hatch, bolts for pressing the hatch upward against its seating, companion-steps and rail formed with a gap to allow the hatch to move to and fro, a wire or like connection fastened to the hatch for rapidly closing the same, and a catch engaging with notches in the hatch to prevent the rebound of the hatch when it is rapidly closed, substantially as described.

In testimony whereof I have hereunto set my hand this 2d day of December, 1896.

GEORGE ALBERT CHADDOCK.

Witnesses:
REG. G. LAYTON,
H. H. WARD.